United States Patent
Lin et al.

(10) Patent No.: US 7,324,092 B2
(45) Date of Patent: Jan. 29, 2008

(54) ELECTRONIC DEVICE HINGE STRUCTURE

(75) Inventors: Tien-Chang Lin, Taipei (TW); Xin-Jie Miao, Taipei (TW)

(73) Assignee: Inventec Corporation (TW)

( * ) Notice: Subject to any disclaimer, the term of this patent is extended or adjusted under 35 U.S.C. 154(b) by 410 days.

(21) Appl. No.: 11/053,723

(22) Filed: Feb. 7, 2005

(65) Prior Publication Data

US 2006/0176652 A1  Aug. 10, 2006

(51) Int. Cl.
*G09G 5/00* (2006.01)
*H04B 1/38* (2006.01)

(52) U.S. Cl. .................. 345/169; 361/681; 455/575.1; 16/221

(58) Field of Classification Search ................ 455/346, 455/347, 348, 349; 345/1.1–1.3, 905, 169
See application file for complete search history.

(56) References Cited

U.S. PATENT DOCUMENTS

| | | | | |
|---|---|---|---|---|
| 5,796,504 A | * | 8/1998 | Sonderegger et al. ....... | 398/110 |
| 6,832,100 B2 | * | 12/2004 | Hsieh ....................... | 455/550.1 |
| 6,865,778 B2 | * | 3/2005 | Pan et al. ...................... | 16/342 |
| 6,943,542 B2 | * | 9/2005 | Sentoku et al. ............. | 324/174 |
| 6,977,810 B2 | * | 12/2005 | Song .......................... | 361/683 |
| 6,990,711 B2 | * | 1/2006 | Koshikawa et al. .......... | 16/334 |
| 6,999,801 B2 | * | 2/2006 | Cheng et al. ............ | 455/575.1 |
| 7,140,073 B2 | * | 11/2006 | Park et al. ..................... | 16/348 |
| 7,207,086 B2 | * | 4/2007 | Yang ........................... | 16/366 |

* cited by examiner

*Primary Examiner*—Duc Q. Dinh
(74) *Attorney, Agent, or Firm*—Peter F. Corless; Steven M. Jensen; Edwards Angell Palmer & Dodge LLP

(57) ABSTRACT

An electronic device hinge structure includes at least one rotation shaft horizontally protruded on a side of a display unit of the electronic device and having a bearing portion formed on at least one end thereof; and at least one bearing member formed on a side of a base unit of the electronic device at a position corresponding to the rotation shaft on the display unit, and having a supporting portion formed thereon at a position corresponding to the bearing portion, such that the bearing portion correspondingly abuts against and is supported on the supporting portion so as to reinforce structural strength of the display unit and prevent scratches of a housing of the electronic device caused by bezels on the display unit if being deformed by external force.

6 Claims, 2 Drawing Sheets

ELECTRONIC DEVICE HINGE STRUCTURE

FIELD OF THE INVENTION

This invention relates to electronic device hinge structures, and more particularly, to a hinge structure for mechanically and electrically coupling a display unit to a base unit of an electronic device.

BACKGROUND OF THE INVENTION

For a conventional electronic device, cold cathode fluorescent lamps (CCFLs) are provided on two sides of a liquid crystal display (LCD) of the electronic device, and the CCFLs have a longer irradiation distance, thereby making illumination of the LCD screen relatively dim. In recent years, there has been provided an electronic device with a wide LCD unit, wherein CCFLs are located underneath the LCD unit, and the LCD unit is pivoted on a side of a base unit of the electronic device, such that the CCFLs have a shorter irradiation distance to improve brightness and contrast of the screen.

Currently, in the foregoing electronic device with CCFLs being provided underneath the display unit, the location of CCFLs corresponds to a position where the display unit is pivoted on the base unit, and thus a housing of the display unit must have a considerable thickness. Generally, the housing thickness of the display unit is set as 1.8 to 2.0 mm, and a gap between the assembled display unit and base unit when the display unit covers the base unit is approximately 1.2 to 1.5 mm. However, such thickness and gap do not facilitate the requirements of light weight and thin profile for an electronic device.

In order to satisfy the requirements of light weight and thin profile for an electronic device, it has been proposed to reduce the housing thickness of the display unit to 1.40 mm and reduce the gap between the base unit and the display unit when covering the base unit to 0.8 mm, such that the weight of the electronic device is decreased by about 25% to 40% as compared to the foregoing design. However, such reduction in the thickness of the display unit housing is limited and causes degradation of structural strength of the display unit. As a result, under a condition of being exerted with force, the display unit may easily be bent and deformed, and thus bezels on the display unit at a hinge portion being pivoted on the base unit would scratch and damage a surface of the hinge portion due to undesirable contact therebetween, thereby impairing the appearance of the electronic device.

Accordingly, a current solution to the above problem and for achieving light weight and thin profile of the electronic device is to modify a material for housings of both the display unit and the base unit of the electronic device. That is, a magnesium-aluminum alloy, which has high intensity, light weight and small thickness, is employed for fabricating the housings of the display unit and the base unit, so as to avoid damage to the appearance of the hinge portion caused by the deformed display unit exerted with force.

Another solution is to apply an abrasion resistant coating on surfaces of the housings, for example, adding a nano metallic oxide to the coating, so as to increase abrasion resistance for the housing surfaces and prevent surface scratches.

However, using the magnesium-aluminum housing or the abrasion resistant coating requires the expensive magnesium-aluminum alloy material and fabrication processes, or needs the expensive coating additive, such that the fabrication cost would be significantly increased.

Therefore, the problem to be solved here is to prevent damage to a housing caused by bezels of a display unit deformed by force, and satisfy the requirements of light weight and thin profile for an electronic device, without increasing the fabrication cost thereof.

SUMMARY OF THE INVENTION

In light of the drawbacks in the prior art, a primary objective of the present invention is to provide an electronic device hinge structure, which can prevent damage or scratches of a housing caused by force-induced deformation of a display unit of the electronic device.

Another objective of the present invention is to provide an electronic device hinge structure, which can keep the electronic device light and portable.

A further objective of the present invention is to provide an electronic device hinge structure without increasing the fabrication cost of the electronic device.

To achieve the aforementioned and other objectives, the present invention proposes an electronic device hinge structure. The electronic device comprises a display unit and a base unit on which the display unit is pivoted. The hinge structure comprises at least one rotation shaft horizontally protruded on a side of the display unit, and having a bearing portion formed on at least one end thereof; and at least one bearing member formed on the base unit at a position corresponding to the rotation shaft, and having a supporting portion formed thereon at a position corresponding to the bearing portion, such that the bearing portion correspondingly abuts against and is supported on the supporting portion so as to prevent a housing of the electronic device from being scratched or damaged by bezels on the display unit if being deformed by external force.

The hinge structure is applied to the electronic device, such as a portable computer. When the display unit is exerted with external force, for example being pressed by a user's arms, and becomes deformed, the supporting portion located at a side of the base unit supports the bearing portion of the rotation shaft on the display unit, so as to provide better pivot strength and better structural strength for the display unit to prevent deformation of the display unit by force. This further avoids scratches or damages of a housing at a hinge portion between the display unit and the base unit caused by the bezels of the display unit if being deformed, and thus maintains the appearance of the electronic device such as portable computer intact.

Moreover, the hinge structure in the prevent invention for reinforcing the connection between the display unit and the base unit is to form the supporting portion on the bearing member of the base unit and form the bearing portion on the rotation shaft of the display unit. This does not alter the original structural design of the electronic device, but simply adds components to the original structure. Such arrangement is simple to implement and easy to realize. Further, there is no need to change housing materials of the display unit and the base unit or use an expensive material such as a coating material with enhanced abrasion resistance. Therefore, the fabrication cost can be reduced.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
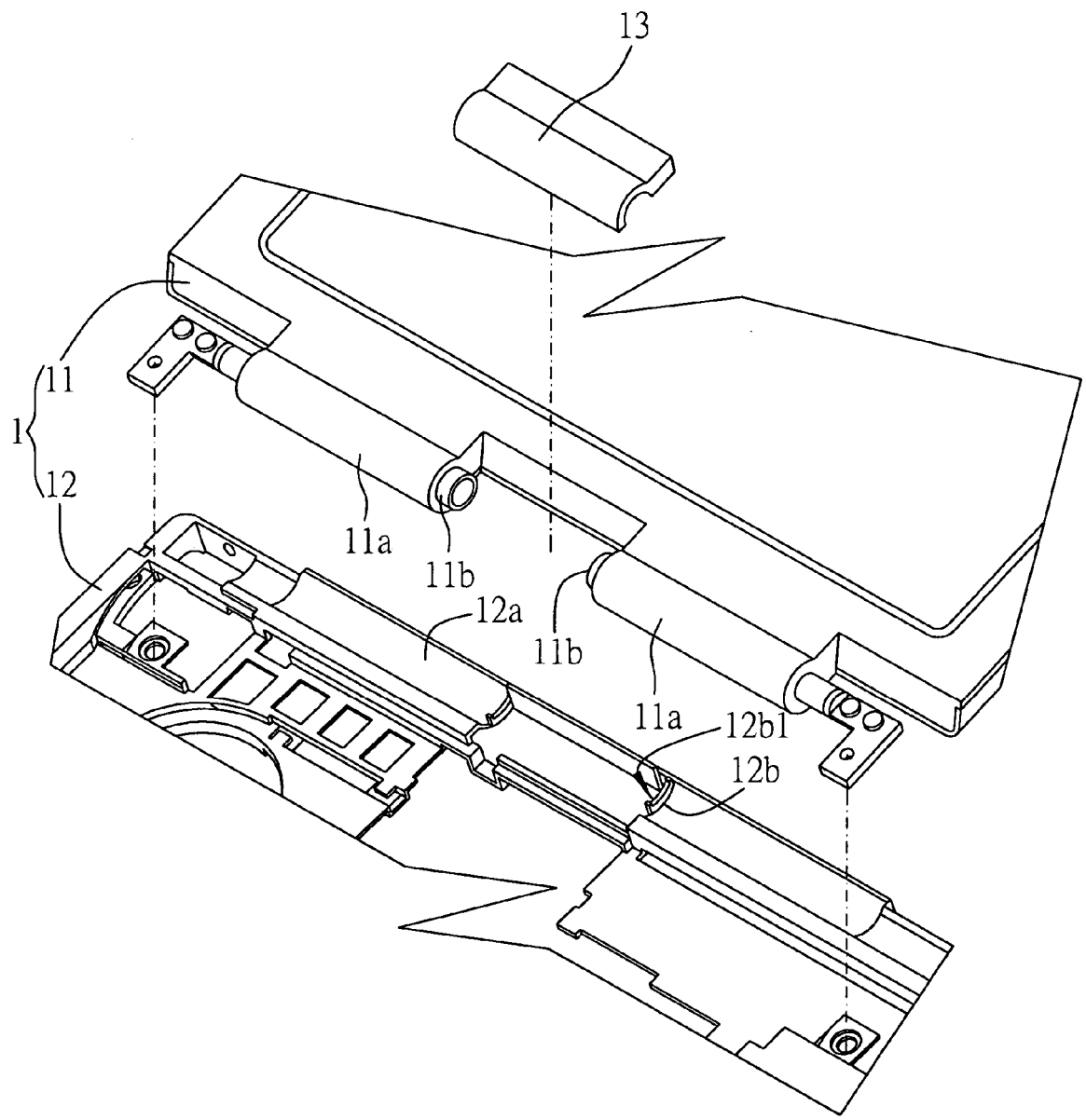
FIG. 1 is a perspective and exploded view of an electronic device hinge structure according to the present invention.
Figure 2:
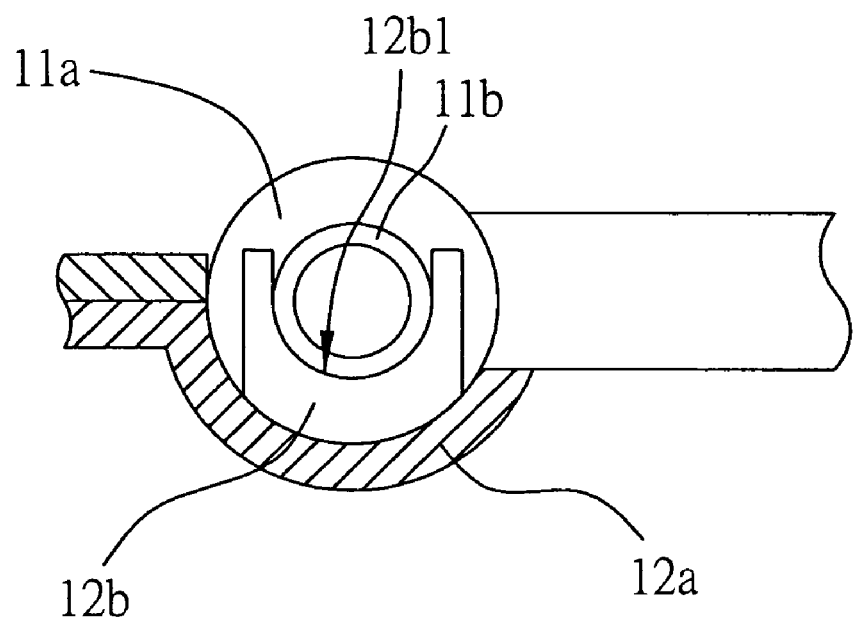
FIG. 2 is a partial cross-sectional view of the electronic device hinge structure according to the present invention.
Figure 3:
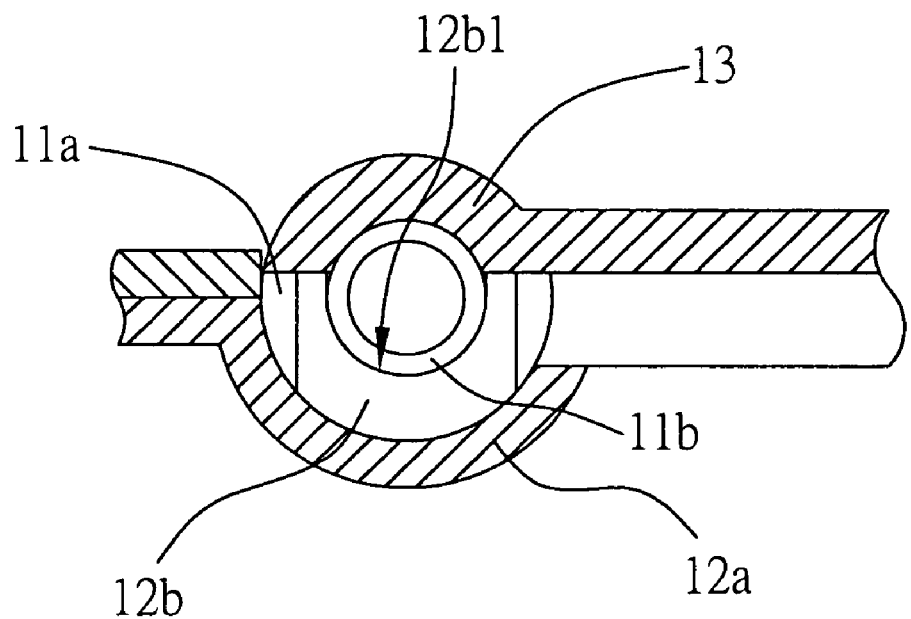
FIG. 3 is a partial cross-sectional view of the electronic device hinge structure including a cover according to the present invention.

FIG. 1 is a perspective and exploded view of an electronic device hinge structure according to the present invention. The hinge structure is primarily applied to an electronic device 1 such as a portable computer. The electronic device 1 comprises a display unit 11 and a base unit 12 on which the display unit 11 is pivoted. The hinge structure comprises at least one rotation shaft 11a horizontally protruded on a side of the display unit 11 and having a columnar shape, wherein a bearing portion 11b is formed on at least one end of the rotation shaft 11a and has a round disc shape, and the rotation shaft 11a has a larger external diameter than that of the bearing portion 11b; at least one bearing member 12a formed on a side of the base unit 12 at a position corresponding to the rotation shaft 11a, and having a supporting portion 12b formed thereon at a position corresponding to the bearing portion 11b, wherein the supporting portion 12b is shaped as a rib plate having an arc recess 12b1, and the bearing portion 11b correspondingly abuts against and is supported on the supporting portion 12b, as shown in FIG. 2; and at least one cover 13 formed on the side of the base unit 12 and located outside the rotation shaft 11a to cover the rotation shaft 11a.

The rotation shaft 11a of the display unit 11 cooperates with the bearing member 12a of the base unit 12 to allow the display unit 11 to be opened/lifted up or closed/covered down by rotation with respect to the base unit 12. Moreover, the bearing portion 11b is extended from the rotation shaft 11a and abuts against the arc recess 12b1 of the supporting portion 12b, such that the supporting portion 12b can support the bearing portion 11b of the display unit 11 and allow the display unit 11 to be rotated stably.

If the display unit 11 is deformed by external force, since the bearing portion 11b of the rotation shaft 11a of the display unit 11 is supported on the supporting portion 12b of the bearing member 12a of the base unit 12, this provides better structural strength for a pivot portion between the display unit 11 and the base unit 12, so as to prevent scratches or damage of a housing of the electronic device 1 caused by deformation of the display unit 11 and avoid influence on the appearance of the electronic device 1.

Furthermore, as the rotation shaft 11a of the display unit 11 is formed with the bearing portion 11b on one end thereof, and the bearing member 12a of the base unit 12 is formed with the supporting portion 12b, housings of the display unit 11 and the base unit 12 can thus be reinforced respectively. For example, if the display unit 11 is made with the current thinnest design such as having the thickness of 1.40 mm, and a gap between the display unit 11 and the base unit 12 when the display unit 11 covers the base unit 12 is set as 0.8 mm, the present invention still provides considerably strong structural strength for the electronic device 1 to avoid deformation of the display unit 11 by force. As a result, a high-intensity thin material or an abrasion resistant coating material is not required to maintain the structural strength of the electronic device 1, such that expensive materials and equipment are avoided and the fabrication cost is reduced.

In addition, after the display unit 11 is pivoted on the base unit 12, the cover 13 is provided to cover the hinge structure without affecting the appearance of the electronic device 1. The bearing portion 11b formed on one end of the rotation shaft 11a and the supporting portion 12b formed on the bearing member 12a are effective to increase the strength of the electronic device 1, without significantly increasing the overall volume or weight of the electronic device 1, thereby satisfying the requirements of light weight and thin profile for the electronic device 1.

Therefore, the hinge structure in the present invention is used to couple a display unit to a base unit of an electronic device, so as to prevent scratches or damage of a housing caused by undesirable contact with bezels of the display unit if being deformed, and keep the electronic device light and portable, without increasing the fabrication cost.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claim is:

1. An electronic device hinge structure, the electronic device having a display unit and a base unit where the display unit is pivoted, the hinge structure comprising:

at least one rotation shaft horizontally protruded on a side of the display unit and having a bearing portion formed on at least one end thereof; and at least one bearing member formed on a side of the base unit at a position corresponding to the rotation shaft, and having a supporting portion formed thereon at a position corresponding to the bearing portion, such that the bearing portion correspondingly abuts against and is supported on the supporting portion.

2. The electronic device hinge structure of claim 1, further comprising at least one cover formed on the side of the base unit and located outside the rotation shaft to cover the rotation shaft.

3. The electronic device hinge structure of claim 1, wherein the electronic device is a portable computer.

4. The electronic device hinge structure of claim 1, wherein the bearing portion has a round disc shape.

5. The electronic device hinge structure of claim 4, wherein the rotation shaft has a larger external diameter than that of the bearing portion.

6. The electronic device hinge structure of claim 1, wherein the supporting portion comprises a rib plate having an arc recess.

* * * * *